(12) United States Patent
Bishop

(10) Patent No.: US 6,358,057 B1
(45) Date of Patent: Mar. 19, 2002

(54) WINDOW BREAKING AND CLEARING TECHNIQUE TRAINING DEVICE

(76) Inventor: Michael Bishop, 64-19 65th St., Middle Village, NY (US) 11379

( * ) Notice: Subject to any disclaimer, the term of this patent is extended or adjusted under 35 U.S.C. 154(b) by 0 days.

(21) Appl. No.: 09/487,113

(22) Filed: Jan. 19, 2000

(51) Int. Cl.[7] .............................................. G09B 19/00
(52) U.S. Cl. ..................................... 434/226; 52/204.5
(58) Field of Search ....................... 434/226; 52/204.53, 52/204.57, 204.71, 204.5

(56) References Cited

U.S. PATENT DOCUMENTS 2,124,354 A * 7/1938 Plym
2,288,548 A * 6/1942 Peremi
2,777,548 A * 1/1957 Adams
6,058,667 A * 5/2000 MacDonald ................. 52/239

* cited by examiner

Primary Examiner—Kien T. Nguyen
Assistant Examiner—Urszula M. Cegielnik
(74) Attorney, Agent, or Firm—Goldstein Law Offices, P.C.

(57) ABSTRACT

A firefighter training device, for training a firefighter proper techniques for breaking and clearing a window, using a frame defining a framed space, a plurality of transparent impact resistant panels which are arranged coplanarly to fill the framed space, and a plurality of panel retaining assemblies which selectively hold the panels in position. Once the panels are formed into a window like configuration, the panels are struck, causing one of the panels to break away as the panel retaining assembly releases that panel. Then, the remaining panels are struck to cause those panels to break away and to simulate the proper action of clearing the window after it has been initially broken. Following the exercise, the panels are restored to the frame so that the exercise may be repeated.

7 Claims, 5 Drawing Sheets

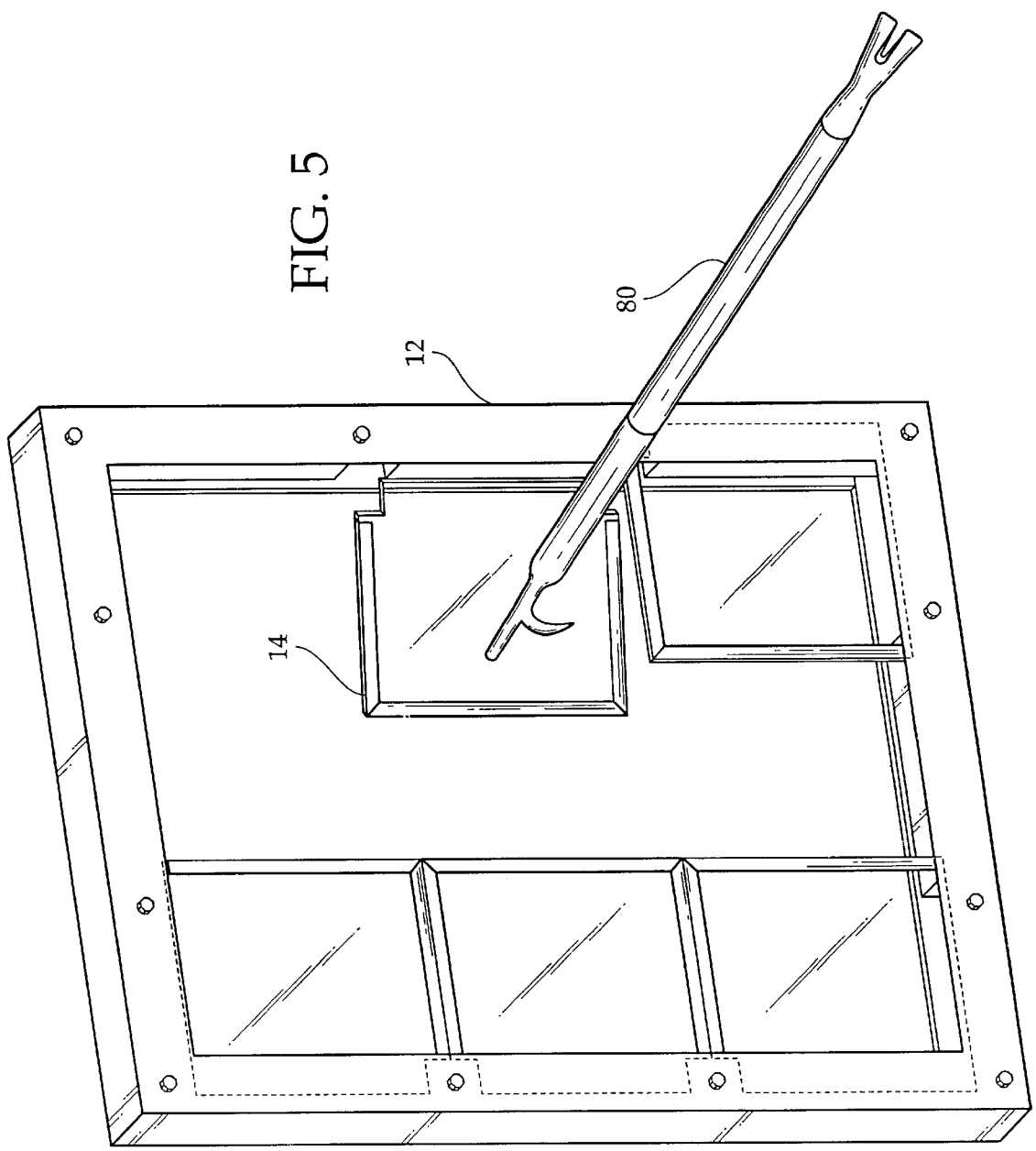

WINDOW BREAKING AND CLEARING TECHNIQUE TRAINING DEVICE

BACKGROUND OF THE INVENTION

The invention relates to a window breaking and clearing technique training device. More particularly, the invention relates to a device which allows a firefighter to be trained the proper technique for breaking and clearing a window, without requiring the use of an actual glass window to effectively demonstrate the appropriate technique.

In gaining entry to a burning building, a firefighter must often take quick, effective, yet destructive action. One such action is to break a window and enter the building through the window frame. Although breaking a window seems easy, improper technique and failure to fully clear the window can lead to injury.

What is necessary is that the firefighter first shatter the glass with a powerful strike, and then carefully but quickly clear the broken shards from all edges of the window. Only then should the firefighter attempt to climb through the window frame.

Because of the special technique necessary to break a window and enter therethrough, firefighter training courses often include instructor demonstrations and trainee practice of proper window breaking techniques. Unfortunately, these demonstrations require a live, glass window. Such windows are expensive—raising the cost of firefighter training. In addition, repeatedly using live glass means that injuries are more likely to occur during training.

It is well known that when training any technique, especially when training one which must be performed under duress, speed and accuracy can only be obtained through repetition. However, because of the expense of the glass windows, training is usually limited to just a few attempts per firefighter trainee.

SUMMARY OF THE INVENTION

It is an object of the invention to produce a training device which teaches a firefighter the proper technique for breaking and clearing a window, so that the firefighter may safely climb through the window frame. Accordingly, the device requires the firefighter to simulate the same actions necessary to break the window and to clear glass from the window frame.

It is another object of the invention to provide a firefighter training device which allows each firefighter to practice the window breaking techniques numerous times, without expending numerous glass windows in the process. Accordingly, the training device is constructed with individual panels which do not actually break during the training exercise, but which break away from the frame to simulate the breaking of the glass. Following the exercise, the panels are easily restored to their original positions to allow the exercise to be repeated.

The invention is a firefighter training device, for training a firefighter proper techniques for breaking and clearing a window, using a frame defining a framed space, a plurality of transparent impact resistant panels which are arranged coplanarly to fill the framed space, and a plurality of panel retaining assemblies which selectively hold the panels in position. Once the panels are formed into a window like configuration, the panels are struck, causing one of the panels to break away as the panel retaining assembly releases that panel. Then, the remaining panels are struck to cause those panels to break away and to simulate the proper action of clearing the window after it has been initially broken. Following the exercise, the panels are restored to the frame so that the exercise may be repeated.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 5 is a diagrammatic perspective view, illustrating the remaining panels being "cleared" from the frame to simulate the clearing of the glass around the window frame of a broken window.

DETAILED DESCRIPTION OF THE PREFERRED EMBODIMENTS

Figure 1:
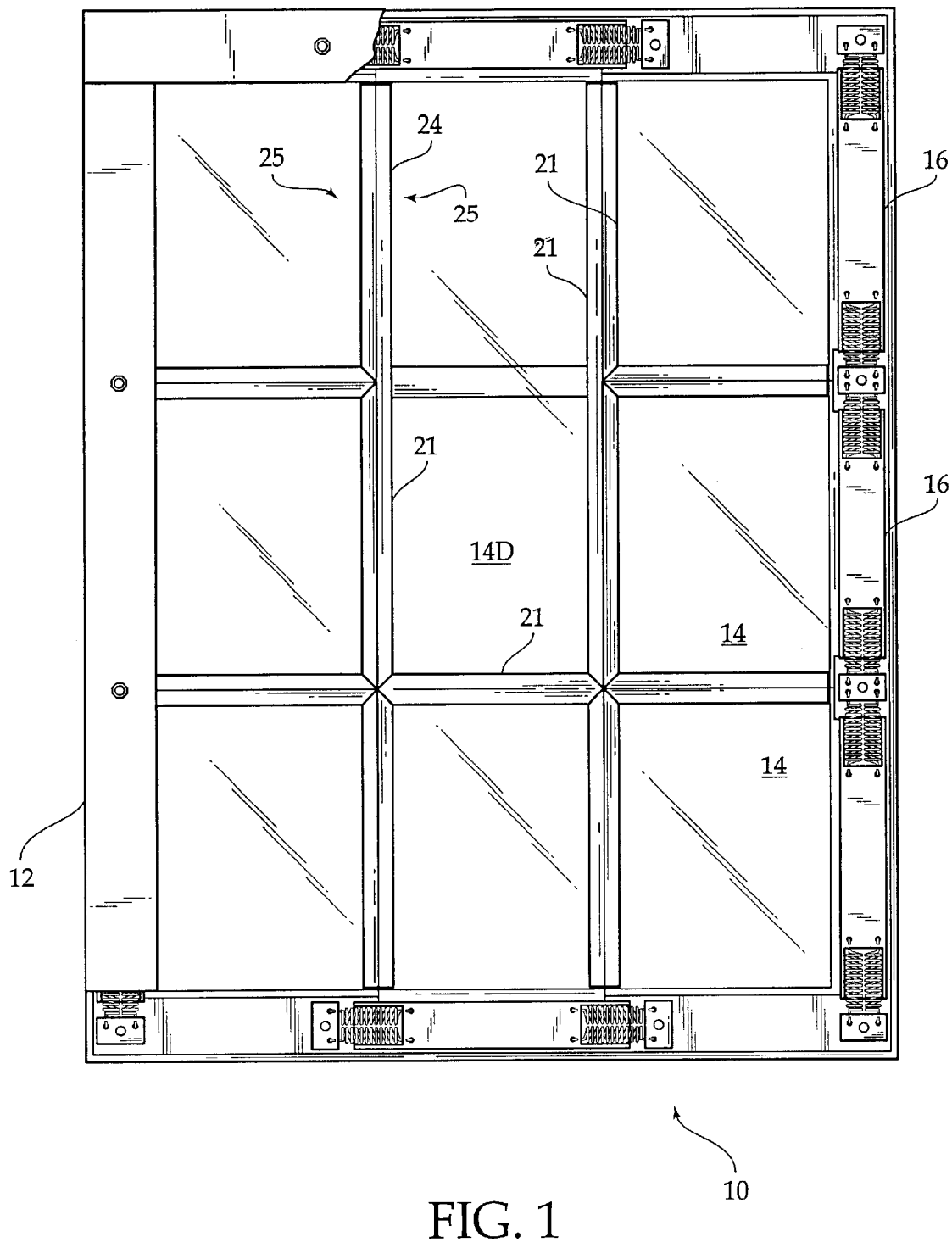
FIG. 1 is a front elevational view of the training device, with parts broken away, illustrating the fully assembled training device which simulates a window and multiple panels thereof.

FIG. 1 illustrates a training device 10 which is used to train a firefighter the proper technique for breaking and clearing a window before entering a burning structure. The training device 10 comprises a frame 12, which is generally rectangular, having a framed space defined thereby, and a plurality of panels 14. The panels 14 are held in place by panel retaining assemblies 16, which maintain said panels 14 in a substantially coplanar arrangement with each other wherein said panels fill said framed space and provide a divided-light, window-like appearance.

Figure 3:
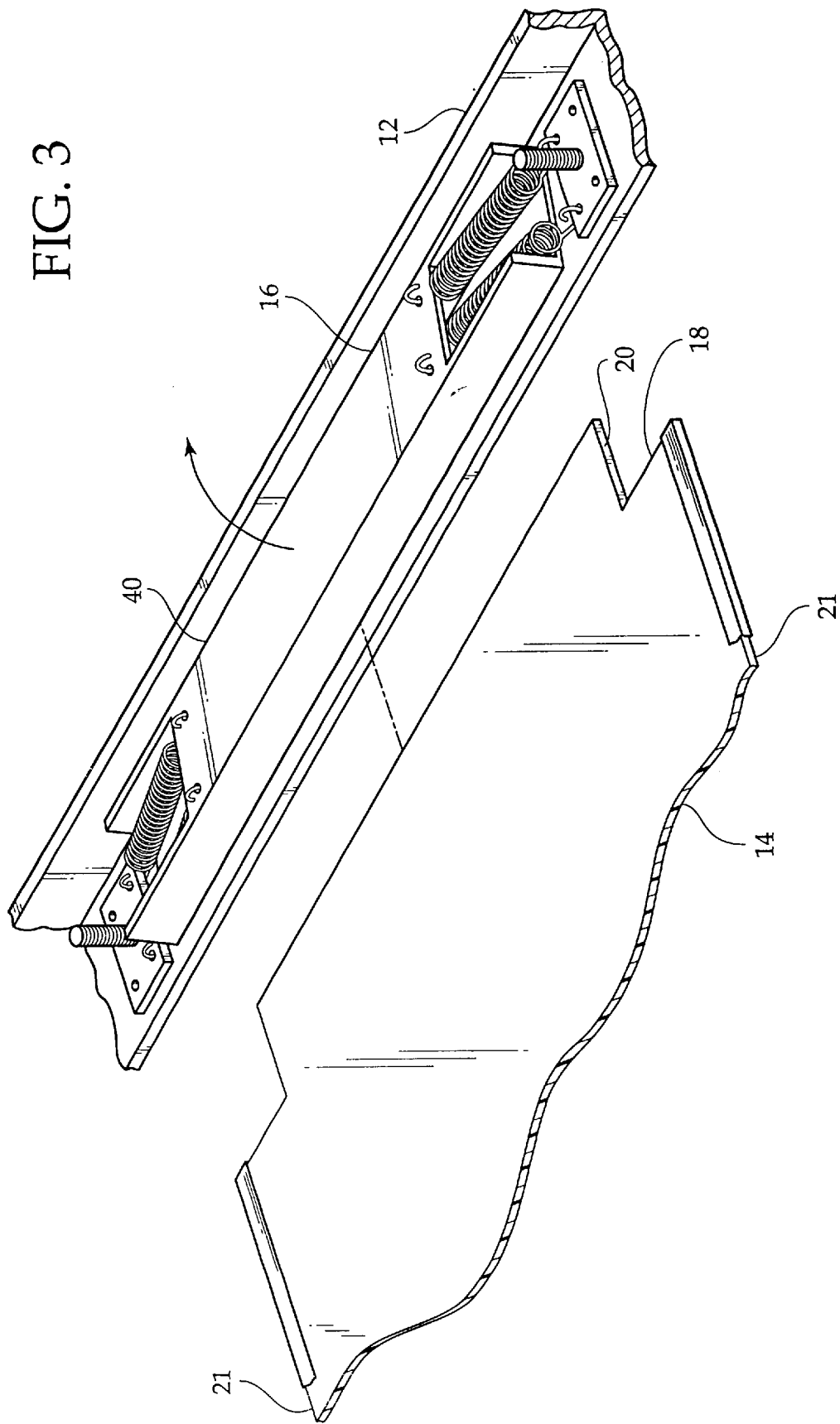
FIG. 3 is a diagrammatic perspective view, illustrating one of the panels being inserted into one of the panel retaining assemblies to assemble the window to allow execution of a training exercise according to the present invention.

Each of the panels 14 is made of a transparent, high breaking strength material, such as LEXAN, so that each panel 14 visually resembles glass, but does not break upon impact in the way that glass would. Referring momentarily to FIG. 3, each of the panels 14 has a main portion 18 and a tab 20. The tab is held in place by the panel retaining assemblies 16. The main portion 18 is substantially rectangular, and has two or three adjoinable edges 21. The adjoinable edges 21 meet other adjoinable edges 21 of other panels 14 when all panels are assembled within the frame 12.

Referring back to FIG. 1, the panels 14 have a series of moldings 24 having molding slots 25 which allow the adjoinable edges 21 to connect so that a substantially planar, window-like surface is created. The moldings 24 fill in the gaps between panels 14 and help keep the panels 14 substantially coplanar.

Because the panel retaining assemblies 16 must be located on the frame 12, only eight panels 14 can be held by the panel retaining assemblies 16. Accordingly, one of the panels 14 is a double panel 14D, and adjoins five other panels 14 along its three adjoinable edges 21. However, the double panel 14D along with the other seven panels 14 simulates a nine "light" window.

Figure 2:
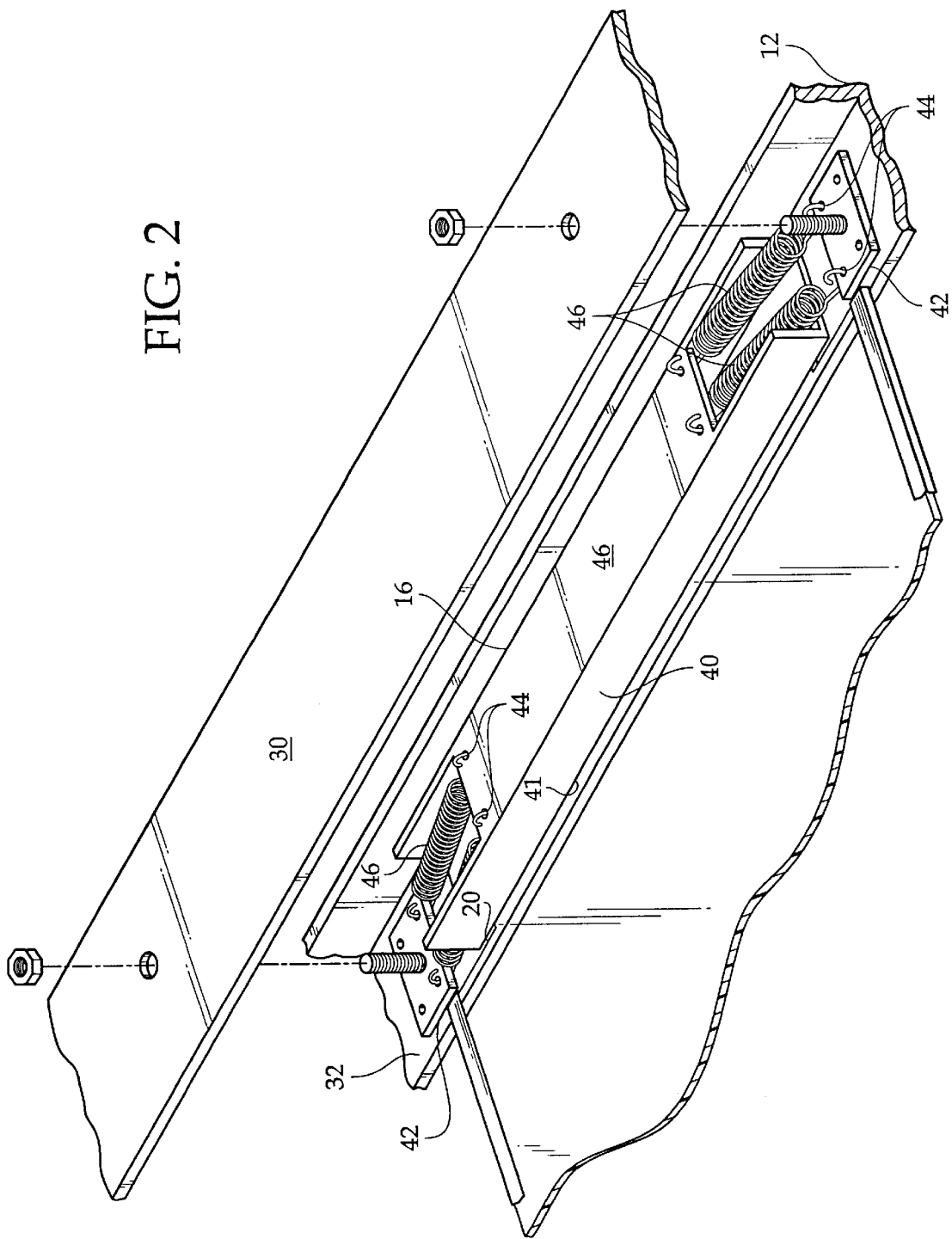
FIG. 2 is an exploded view detailing one of the panel retaining assemblies, maintaining one of the window panels in position.

FIG. 2 details construction of the frame 12 and one of the panel retaining assemblies 16. The frame 12 comprises an outside surface 30 and an inside surface 32. The outside surface 30 acts as facing, and conceals the panel retaining assemblies 16 within the frame 12. The inside surface 32 acts as a mounting base for the panel retaining assemblies 16.

Each panel retaining assembly 16 comprises a carrier 40 having a substantially flat bottom surface 41 which extends substantially parallel to the inside surface 32 of the frame 12. Two end plates 42 are mounted to the inside surface 32, and each have a pair of spring anchoring holes 44. The carrier 40 also has spring anchoring holes 44 at opposite ends thereof. A pair of spring tensioning mechanisms are mounted between each of the end plates 42 and the carrier 40 to bias the carrier 40 flat against the inside surface 32 of the frame.

As seen in FIG. 2, the panel 14 is held in place by the panel retaining assembly 16, wherein the tab 20 of the panel 14 is sandwiched between the flat bottom surface 41 of the panel retaining assembly 16 and the inside surface 32 of the frame by the spring tensioning mechanism.

Each spring tensioning mechanisms preferably comprises a pair of coil springs 46 which are attached between the spring anchoring holes 44 in the end plates 42 and the spring anchoring holes 44 in the carrier 40. Preferably, the carrier has a carrier upper surface 46 which extends parallel to the bottom surface 41, but closer to the outside surface 30 of the frame 12. Preferably then the spring anchoring holes 44 of the carrier 40 are located in the carrier upper surface 46, so that the spring exerts a spring force which has a "vertical" component which tends to hold the panel 14 in place.

FIG. 3 illustrates one of the panel retaining assemblies 16 being operated to allow insertion and subsequent retention of one of the panels 14. The panel retaining assembly 16 is operated by twisting the carrier 40 longitudinally away from the panel 14, inserting the tab 20 under the carrier 40 and then releasing the carrier 40 so that the spring tensioning mechanism holds the tab 20 tightly against the inside surface 32 of the frame 12.

Figure 4:
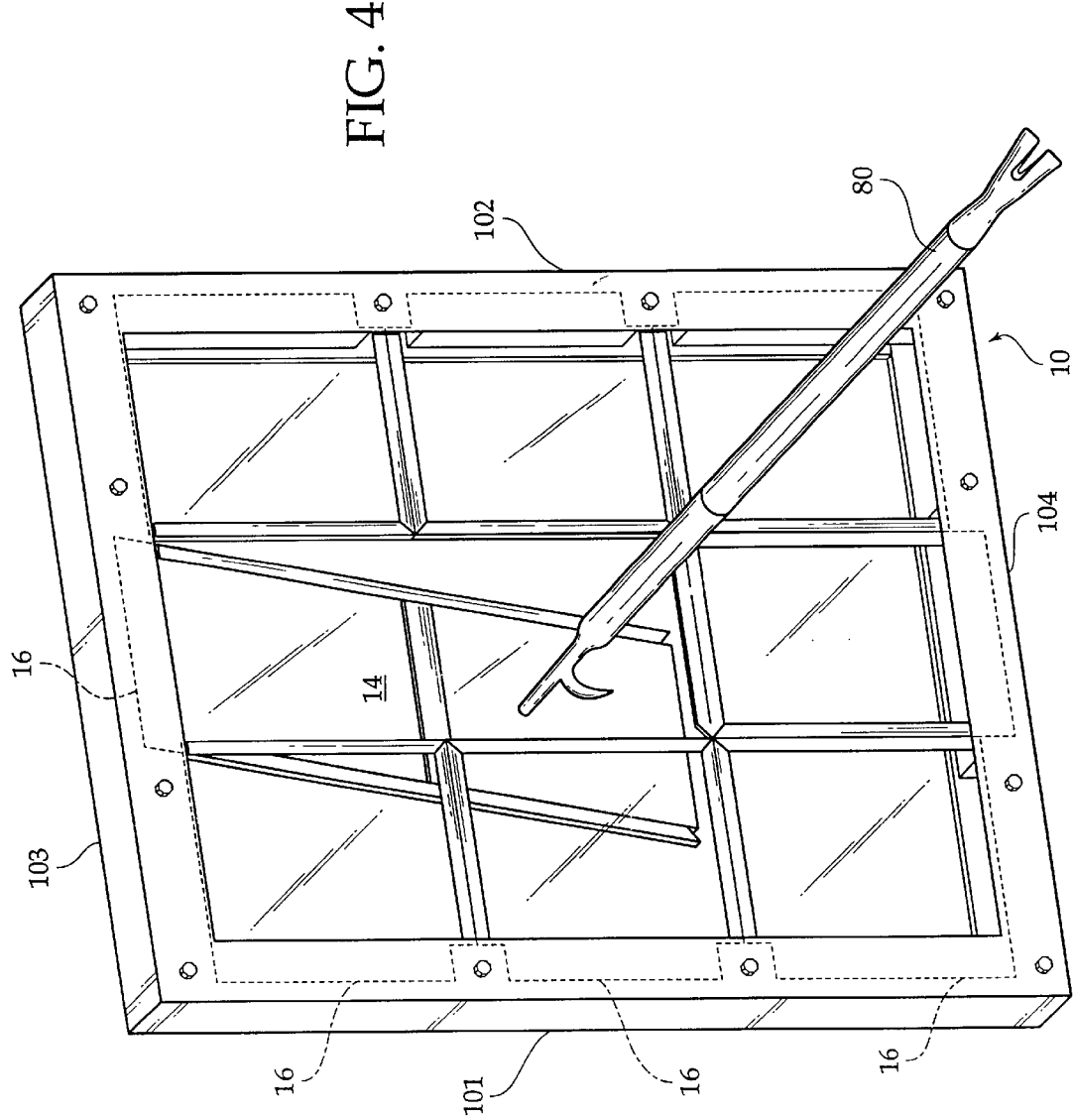
FIG. 4 is a diagrammatic perspective view, illustrating a first step in a training exercise, wherein one of the panels is being "broken away" using a firefighter's haligan tool, to simulate the initial breaking of an actual window.

FIG. 4 illustrates a preferred embodiment of the invention, whereby eight panels 14 are employed, such that seven are substantially the same size and one panel is substantially twice the size of the other seven. Establishing conventions that the frame 12 has parallel first and second sides 101 and 102, parallel third and fourth sides 103 and 104, it is preferred that three panel retaining assemblies 16 are located along each of the first and second sides 101 and 102, while one panel retaining assembly 16 is centered on each of the third and fourth sides 103 and 104.

FIG. 4 and FIG. 5 illustrate the invention in use, wherein a training exercise is being performed. Initially, as indicated in FIG. 4, a haligan tool 80 is used to strike one of the panels 14 of the training device 10. If that panel 14 is struck with sufficient force, it will break free of its associated panel retaining assembly 16 and fall away. However, the other panels will remain, signifying the remaining shards of glass after a live glass window is initially broken. Thus, referring to FIG. 5, the haligan tool 80 is used to systematically sweep the remaining panels 14, until all panels have been removed from the frame 12. Once all panels have been removed, the firefighter can climb through the window.

The foregoing exercise can be repeated in a matter of minutes. Prior to repeating use of the training device 10, each of the panels must be replaced by inserting their respective tabs into the panel retaining devices to "reform" the window. Accordingly, the cycle of performing the training exercise and restoring the window may be reiterated frequently within a short period of time.

In conclusion, herein is presented a firefighter training device which allows a firefighter to be effectively trained in the proper techniques for window breaking and clearing, without requiring wasteful actual window breakage to do so.

What is claimed is:

1. A firefighter training device, for training a firefighter how to properly break and clear a window, comprising:
 a frame, said frame substantially rectangular in shape, having a framed space defined thereby and an inside surface;
 a plurality of panels, each panel made of a transparent impact resistant material, the panels together capable of substantially spanning the framed space with all of the panels extending substantially coplanar, each panel having a tab, each of the panels have adjoinable edges, and the panels have moldings having molding slots for allowing the adjoinable edges to join to form the panels into a window-like configuration; and
 a plurality of panel retaining assemblies, each panel retaining assembly selectively holding at least one of the panels, and selectively releasing that panel upon an impact upon said panel, and each assembly having a carrier which is spring biased against the inside surface of the frame so that the panel is held in place by extending the tab between the carrier and the inside surface, each carrier having a flat bottom surface, an upper surface, and two pairs of spring anchoring holes, each pair of spring anchoring holes being on opposite ends of the carrier, wherein two pairs of coil springs extend between the spring anchoring holes on the carrier and the inside surface of the frame.

2. The firefighter training device as recited in claim 1, comprising at least eight panels and eight panel retaining assemblies associated therewith.

3. The firefighter training device as recited in claim 2, wherein the frame has parallel first and second sides, parallel third and fourth sides, wherein three panel retaining mechanisms are spaced evenly along each of the first side and second side, and wherein one panel retaining mechanism is centered on each of the third side and fourth side.

4. The firefighter training device as recited in claim 2, wherein seven of the panels are substantially the same size and one of the panels is twice the size of the other seven panels.

5. A firefighter training method, using a training device having a substantially rectangular frame defining a framed space, a plurality of impact resistant transparent panels, and a plurality of panel retaining assemblies located on the frame, comprising the steps of:
 (a) filling the framed space with the panels;
 (b) holding each of the panels with one of the panel retaining assemblies to form a substantially coplanar arrangement of the panels;
 (c) causing one of the panels to break away from the frame by forcibly striking one of the panels;
 (d) causing the other panels to break away from the frame by forcibly striking said panels; and
 (e) repeating steps (a) and (b) using the same panels.

6. The firefighter training method as recited in claim 5, wherein the frame has an inside surface, each panel has a tab, the panel retaining mechanism has a carrier having a flat bottom surface which is spring biased against the inside surface, and wherein the step of holding each of the panels with one of the panel retaining assemblies further comprises inserting the tab of that panel between the inside surface and flat bottom surface of the carrier.

7. The firefighter training method as recited in claim 6, wherein the carrier is connected to the inside surface of the frame with two pairs of coil springs, the pairs each extending from the inside surface to opposite ends of the carrier, wherein the step of inserting the tab of the panel between the inside surface and flat bottom surface of the carrier is immediately preceded by longitudinally twisting the carrier away from the panel to create an opening for the tab.

\* \* \* \* \*